Aug. 10, 1926.

1,595,295

H. K. FAIRALL

DOUBLE EMULSION FILM

Filed August 29, 1922

INVENTOR:
HARRY K. FAIRALL,
BY
*Graham Harris*
ATTORNEYS.

Patented Aug. 10, 1926.

1,595,295

UNITED STATES PATENT OFFICE.

HARRY K. FAIRALL, OF LOS ANGELES, CALIFORNIA, ASSIGNOR TO BINOCULAR STEREOSCOPIC-FILM COMPANY, OF LOS ANGELES, CALIFORNIA, A CORPORATION OF CALIFORNIA.

DOUBLE EMULSION FILM.

Application filed August 29, 1922. Serial No. 585,083.

My invention relates to stereoscopic motion pictures.

The principal object of the invention is to produce a film which can be projected through an ordinary motion picture projector without change and which may be viewed stereoscopically.

It is another object of my invention to provide a film having a right hand image on one side thereof and a left hand image on the other side thereof, these images having been previously produced at substantially the same time and constituting views of the same objects, but taken from different viewpoints, and the images being of different color values.

It is another object of this invention to provide a film of the character mentioned in which the right hand and left hand images may be out of registry.

Further objects and advantages will be made evident hereinafter.

Referring to the drawing which is for illustrative purposes only,

Figure 1:
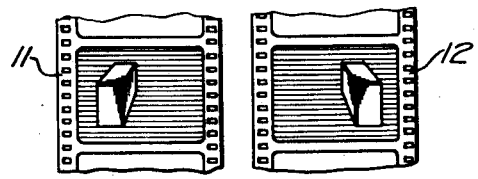
Fig. 1 represents two negative films which are taken in stereoscopic relationship to each other.
Figure 3:
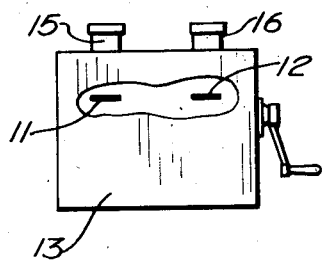
Fig. 3 shows diagrammatically a motion picture camera adapted to produce the film shown in Fig. 1.
Figure 2:
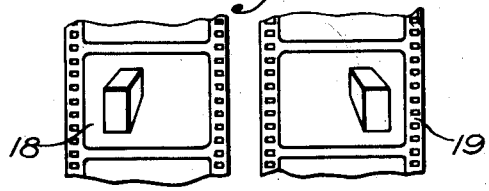
Fig. 2 represents two positive films which are produced from the negatives shown in Fig. 1 by any well known method.
Figure 4:
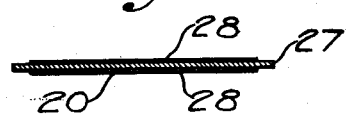
Fig. 4 is a section through a double emulsion film.
Figure 6:
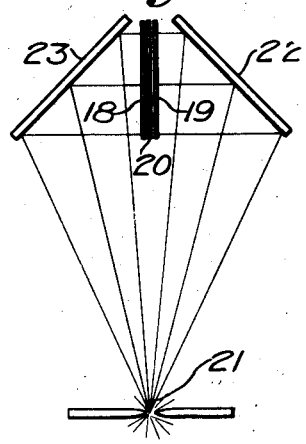
Fig. 6 represents the method of printing the double emulsion positive.
Figure 7:
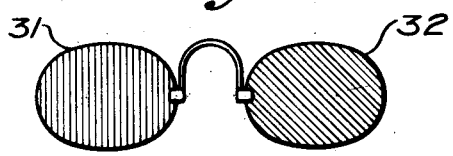
Fig. 7 represents the glasses used in viewing the projected image.

My invention is practised as follows:

Two ordinary stereoscopic negative films 11 and 12 are produced in the camera 13 by taking simultaneous views through lenses 15 and 16 which produces films of the same objects at slightly different viewpoints. These negatives 11 and 12 are thereafter developed, fixed, washed and dried in the ordinary manner, producing a silver image. From these negatives master positives 18 and 19 are produced by contact printing, these positives then being developed, fixed and dried, producing a silver image. The master positives 18 and 19 are then used to print two images on either side of a double emulsion film 20. This double emulsion film, as shown in Fig. 4, which is manufactured and regularly sold by the Eastman Kodak Co., comprises a strip of celluloid 27 having a sensitized emulsion 28 on each side, this emulsion containing a yellow dye which prevents the light from passing through either emulsion and photographically affecting the other. In printing from the negatives 18 and 19 I use a light source 21 and mirrors 22 and 23. The double emulsion film is then developed, washed and dried to produce an ordinary silver image, the right and left hand images shown at 11 and 12 appearing on opposite sides in superimposed relationship. The double emulsion negative film is then treated as follows:

The film is immersed in a strong solution of equal parts of chromate of potash and ferro-cyanide of potash until the film assumes a dirty gray or yellow color and the image practically vanishes. This film is then immersed in a hypo solution, producing a clear film. One side of this film is then covered with pure gum rubber and the film is immersed in an acid dye, the film then being removed and dried. The dyed side of the film is then covered with a coating of thin gum rubber and the gum rubber is removed from the other side. The film is then immersed in a second acid dye to develop the other image. In practice I prefer to use a red dye on one side and a green dye on the other. The finished positive 20 will then have a red image on one side and a green image on the other, these images being positive images due to a reversal of the color value due to the dyeing process. If the film 20 is then projected through an ordinary motion picture projector and is viewed through the glasses shown in Fig. 7, a stereoscopic effect is produced. The glasses each have a red glass 31 and a green glass 32. The eye covered by the red glass 31 sees the green image of the positive film as a black image on a red background. The eye covered by the green glass 32 sees the red image as a black image on a green background. If the relation of the films in the glasses 31 and 32 is correct, which can be determined by trial, a perfect stereoscopic image is produced.

It is old in the art to project a left hand stereoscopic picture of one color and a right hand stereoscopic picture of another color on a screen and to view them through colored glasses to produce a stereoscopic effect. Previous attempts to commercialize this concept have failed since all previous inventors have generally found it necessary to use two separate films and two separate projectors. It is extremely difficult using two separate films to prevent accidental longitudinal displacement of one film with relation to the other, and any considerable displacement of this kind ruins the effect. If, for example, due to lack of synchronization of the two projectors or improper placing of the film therein, a right hand picture is projected with a left hand picture which was one or two exposures earlier or later than the right hand picture, the eye immediately detects the lack of harmony in the action and eye strain and visual dissatisfaction results.

My invention is also broadly new and basic in that, although I insure the proper registry of each right hand picture with its corresponding left hand picture in so far as their longitudinal position on the film is concerned by fixing the right hand image on one side of the film and the left hand image on the other side of the film, I am not obliged to insure any alignment or registry of objects in the pictures themselves, a small lateral or longitudinal displacement of the image of any object in the right hand picture with relation to the image of the same object in the left hand picture being quite permissible. The fixing of the right hand and left hand images on opposite sides of the film is very important to my invention. Not only does it allow sufficient room for the images in case of close-ups or in case a panoramic view is desired, but it also makes the dyeing of the individual images in different colors very easy. As explained hereinbefore, one side of the film may be covered while the other side is being dyed and vice versa.

Figure 5:
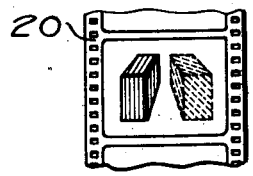
Fig. 5 is a completed positive adapted to be used in the development of my invention.

It is not important to a successful production of the images that they be in exact registry so long as both images of each frame of the film are on the screen at substantially the same time, since each eye sees its own picture perfectly, even though no portion thereof registers with the corresponding portion of the other image. As shown in Fig. 5, the images may be considerably out of registry.

It will therefore be seen that my invention embodies the new and useful conception of a single film which can be projected through an ordinary projector without changing the projector or in any way altering its method of operation.

I claim as my invention:

1. A steroscopic motion picture film comprising: a layer of material containing a right hand image of one color; a layer of material containing a left hand image of another color, said images having been previously produced at substantially the same instant and constituting views of the same objects taken from different viewpoints; and means securing said layers together so that said right hand and left hand images will be in substantially the same horizontal plane.

2. A stereoscopic motion picture film comprising: a layer of material containing a right hand image of one color; a layer of material containing a left hand image of another color, said images having been previously produced at substantially the same instant and constituting views of the same objects taken from different viewpoints, said images not being in register with each other; and means securing said layers together so that said right hand and left hand images will be in substantially the same horizontal plane.

In testimony whereof, I have hereunto set my hand at Los Angeles, California, this 23rd day of August, 1921.

HARRY K. FAIRALL.